United States Patent

Bostrom

[11] 3,955,555
[45] May 11, 1976

[54] AIR AND HEAT CIRCULATION SYSTEM FOR BUILDINGS

[75] Inventor: Lars Arne Boström, Geneva, Switzerland

[73] Assignee: Clima Wall Ltd., Chur, Switzerland

[22] Filed: Mar. 29, 1974

[21] Appl. No.: 456,563

[30] Foreign Application Priority Data
Mar. 30, 1973   Sweden............................ 7304523

[52] U.S. Cl................................. 126/270; 237/1 A
[51] Int. Cl.² ........................................... F24J 3/02
[58] Field of Search...................... 126/270; 237/1 A

[56] References Cited
UNITED STATES PATENTS

| | | | |
|---|---|---|---|
| 1,467,005 | 9/1923 | Lawrence | 237/1 A X |
| 1,957,279 | 5/1934 | Linke | 126/270 UX |
| 2,559,869 | 7/1951 | Gay | 237/1 A |
| 2,559,870 | 7/1951 | Gay | 237/1 A X |
| 2,559,871 | 7/1951 | Gay | 237/1 A |
| 2,917,817 | 12/1959 | Tabor | 126/270 UX |

Primary Examiner—John J. Camby
Assistant Examiner—Henry C. Yuen
Attorney, Agent, or Firm—Beveridge, DeGrandi, Kline & Lunsford

[57] ABSTRACT

A building where the window openings in the facade and/or ceiling are provided with two spaced apart window panes at least one of which has the property of absorbing sun-heat radiation and between which air is allowed to pass, said building being provided with an air and heat circulation system comprising a combination of two different air duct systems. One system comprises at least one closed channel system for circulating air absorbing the heat from the window, which system includes spaces between the window panes and, in the walls, floor and/or ceiling, channels communicating with said spaces. In this system the air is brought to circulate at a speed depending on the desired room temperature. The other system includes a special channel system connected to the rooms for supplying intake air to said rooms. In this system the air is brought to circulate at a speed determined by the desired room ventilation.

10 Claims, 4 Drawing Figures

U.S. Patent  May 11, 1976  3,955,555
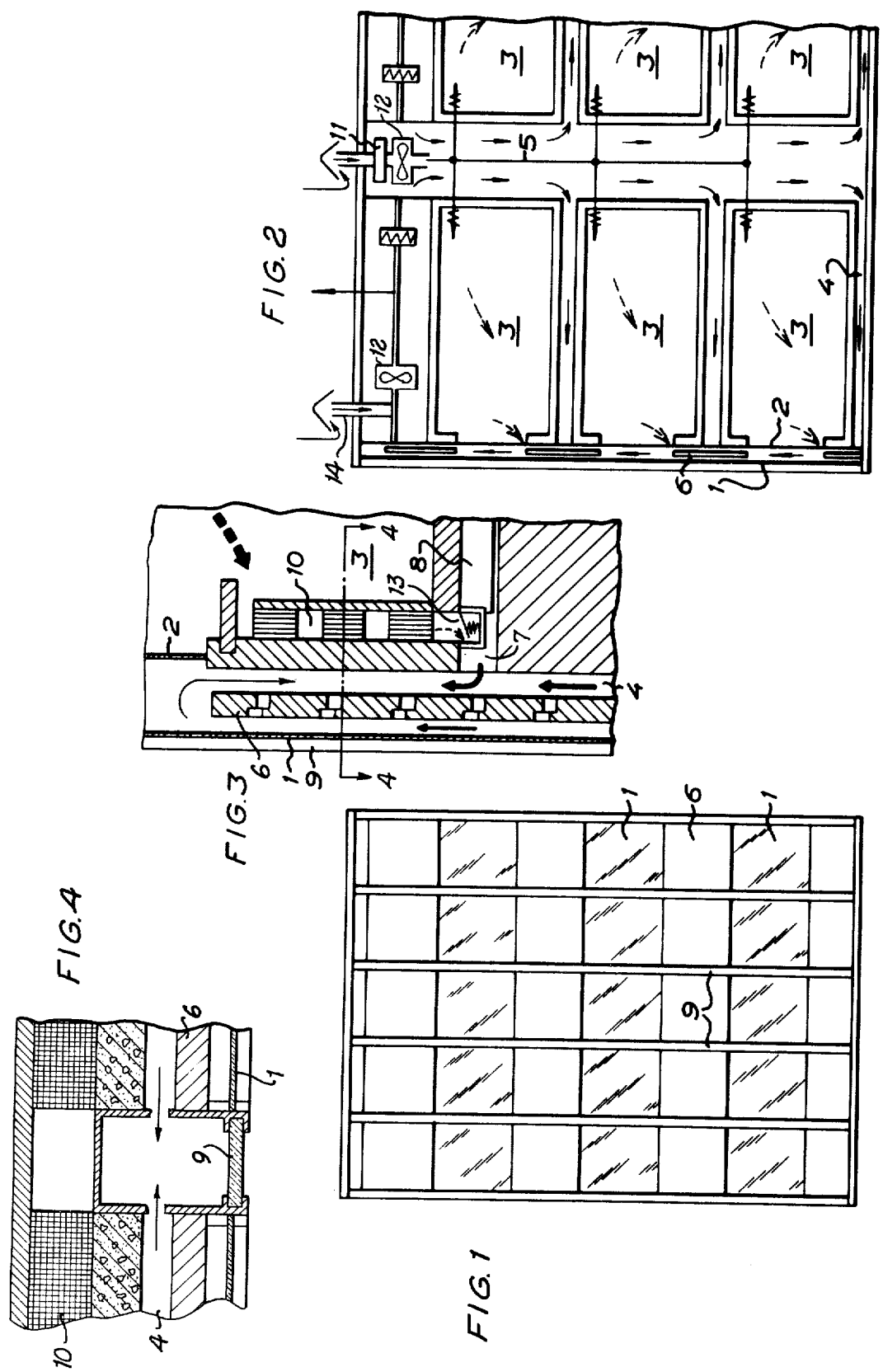

AIR AND HEAT CIRCULATION SYSTEM FOR BUILDINGS

The development in structural engineering, especially concerning office buildings, has resulted in constructions with light walls of low heat-storing capacity. The external walls largely consist of glass. Consequently, the climate inside the building is easily influenced by changes in the climate outside. Heretofore, attempts have been made to overcome these problems by means of heavily dimensioned heating installations which have become even heavier due to the fact that the heat of the waste air often is not recovered. In summer it has become necessary to remove the large addition of heat through cooling installations. Both heating and cooling installations have entailed high initial costs as well as high maintenance and running costs.

The present invention implies a simplification and improvement of conventional ventilating and heating systems. At the same time as this invention involves substantially reduced costs it permits controlling the climate inside the building so that this will be comfortable both with respect to temperature and air circulating speed. Thus, the invention relates to an air and heat circulation system for one-storeyed or multi-storeyed buildings where the window openings in the facade and/or ceiling are provided with two spaced apart window panes at least one of which has the property of absorbing the sun-heat radiation and between which air is allowed to pass. This system comprises a combination of two different air duct systems one of which includes at least one closed channel system for circulating air absorbing the heat from the window, which system includes spaces between the window panes and, in the walls, floor and/or ceiling, channels communicating with said spaces, means being provided to impart to the air circulating in said system a speed depending on the desired room temperature, the other system including a special channel system connected to the rooms for supplying intake air thereto, and means imparting to the air in this system a speed determined by the desired room ventilation. The air absorbing the heat from the windows can thus be brought to circulate at a speed such that the temperature in the rooms will be within acceptable limits without there being any draught as the speed of the intake air can be made quite independent of the heat transport.

The invention will be described more fully hereinafter with reference to the accompanying drawing which schematically illustrates a building including an air and heat circulation system designed in accordance with the invention, in which:

FIG. 1 is a front view of the building;

FIG. 2 is a longitudinal sectional view of the building;

FIG. 3 shows on a larger scale a detail according to FIG. 2; and,

FIG. 4 is an enlarged sectional view on line 4—4 of FIG. 3.

The building, which according to the drawing is a three-storeyed building, has in the window openings in the facade two spaced apart, single or double glazed window panes 1 and 2. At least one of said window panes 1 and 2 has the property of absorbing heat radiation from the sun.

The spaces between the window panes 1 and 2 form part of a channel system 4 provided in the walls, floor and/or ceiling, for circulating air, which is represented by continuous arrows in the drawing. This air is thus allowed to pass between the window panes 1 and 2 to absorb heat therefrom. The rooms 3 in the building are connected to a special channel system 5 for supply of fresh air, represented by broken arrows, to said rooms. Both systems include fans 12 adapted to impart to the air the speed suitable for the purpose.

As appears from the embodiment shown in the drawing, the rooms 3 are connected to the channel system 4 via nonreturn valves 13 or like means in such a way that the waste air passes to said channel system 4 without any risk of the air in this system 4 passing into the rooms 3. The most simple way of obtaining this effect is to keep the pressure in the channel system 4 lower than in the rooms 3.

One or both of the window panes has the property of absorbing radiation over a wavelength range of 700–2,000 nm. By adding a transparent colour correction layer absorbing radiation over the wavelength range 300–500 nm, there is obtained a colour restoration of residual visual light admitted into the rooms, which substantially will comprise the wavelengths 500–700 nm in the spectrum.

At the side of the window openings the building is provided with particular sun-heat absorbing elements 6 which are included in the channel system 4 so that the air in said system passes said elements. According to the drawing the elements 6 are positioned at such a distance inwardly of prolongations of the window panes 1 that the air in the channel system 4 passes on both sides of the elements 6.

The favourable equalizing effect produced by a heavy wall structure with high heat-storing capacity is, in this building, suitably transmitted to the concrete floors. This is effected by allowing at least certain portions of the air from the spaces between the window panes 1 and 2 to pass through apertures 7 in the concrete floors. In order to give the concrete floors a high heat-storing capacity the surfaces of the apertures are provided with closely spaced flanges 8. Alternatively, the channel system may be arranged so as to pass other parts of the building having high heat-storing capacity.

It is important, especially in summer time, to supply to the channel system 4 as cold air as possible from outside in order to carry away heat. For this purpose the channel system 4 is provided with an intake 14 communicating with the outside air and positioned on the shady side of the building. If desired, the channel system 4 may be provided with several intakes which are in the shade during different parts of the day, and when supply of cold outside air is desired that intake is used which is in the shade for the time being. Alternatively, when the air at some distance from the building has a lower temperature than the air adjacent the building, the air intake may be in the form of a chimney.

In addition to the window panes described above, the facade contains elements 9 ventilated by the outside air and permeable to aqueous steam to give the air circulating in the channel system 4 the desired humidity. The elements 9 will thus form walls of the channel system 4.

The channel system 4 also contains water-cooled, permeable elements to give the circulating air a lower temperature. These elements may consist of the elements 9.

As is apparent from FIG. 3, the connection 10 of the rooms 3 with the channel system 4 is situated adjacent the outer wall of the building and includes or is formed as a sound-absorbing means. The channel system 4 includes the passages formed of the apertures 7 in the concrete floor and opening at the front edge of the said floor, said rooms 3 being connected with said passages inwardly of the openings of the latter so as to reduce noise caused by the resistance to sound in counter-current air indicated in FIG. 3 by the arrow 15.

Especially in summer, fresh air in the channel system 5 may be brought to pass a dehumidifier 11 which reduces the air humidity occurring in connection with high ambient temperatures. This permits increased evaporation from the skin, which contributes to the sense of comfort. The channel system 5 may also be provided with air filter and like means.

The invention is not limited to the embodiment described in the foregoing and shown in the drawing but may be modified within the scope of the appended claims.

What I claim and desire to secure by Letters Patent is:

1. An air and heat circulation system for a building having window openings provided with two spaced apart window panes at least one of which has the property of absorbing sunheat radiation and between which air is allowed to pass, comprising a first air duct system including at least one closed channel portion for circulating air absorbing the heat from the window, which closed channel portion includes as a part thereof said spaces between said window panes and channels in the structural portion of the building connected to said spaces, blower means for imparting to the air in said first air duct system a flow rate which varies depending on the desired room temperature within the building, and a second duct system including a special channel system connected to individual rooms within the building for supplying ventilation air thereto, and blower means imparting to the air in said spaced channel system a speed determined by the desired room ventilation.

2. An air and heat circulation system as claimed in claim 1, further comprising non-return valves connecting rooms in said building to said closed first air duct system, said non-return valves permitting excess air in said rooms to pass into said first air duct system.

3. An air and heat circulation system as claimed in claim 1, wherein said window pane having the property of absorbing sun-heat radiation is adapted to absorb radiation over a wavelength range of 700–2,000 nm, and wherein there is obtained a colour restoration of admitted visual light by absorption of radiation over the wavelength range 300–500 nm.

4. An air and heat circulation system as claimed in claim 3, wherein the building, at the side of the window openings, is provided with sun-heat absorbing elements which are disposed within said closed channel portion whereby air flowing therethrough passes said sun-heat absorbing elements.

5. An air and heat circulation system as claimed in claim 4, further comprising heat accumulator means mounted within said first air duct system for transferring heat from and to air circulating therein.

6. An air and heat circulation system as claimed in claim 5, wherein said first air duct system includes at least one intake communicating with the outside air.

7. An air and heat circulation system as claimed in claim 1, further comprising water permeable elements within said closed channel system, said water permeable elements being ventilated by the outside air to give the circulating air a lower humidity.

8. An air and heat circulation system as claimed in claim 1, further comprising water-cooled permeable elements within said first air duct system to reduce the temperature of air circulating therethrough.

9. An air and heat circulation system as claimed in claim 2, further comprising valve means connecting the interior of rooms in said building with said first air duct system, said valve means being situated adjacent the outer wall of the building and including a sound-absorbing means.

10. An air and heat circulation system as claimed in claim 9, wherein said building has concrete floors, and wherein said closed channel portion of said first duct system includes passages arranged in the concrete floor and openings at the front edge thereof, said rooms being connected to said passages inwardly of the openings thereof to reduce noise caused by the resistance to sound in counter-current air.

* * * * *